United States Patent Office 3,267,346
Patented August 16, 1966

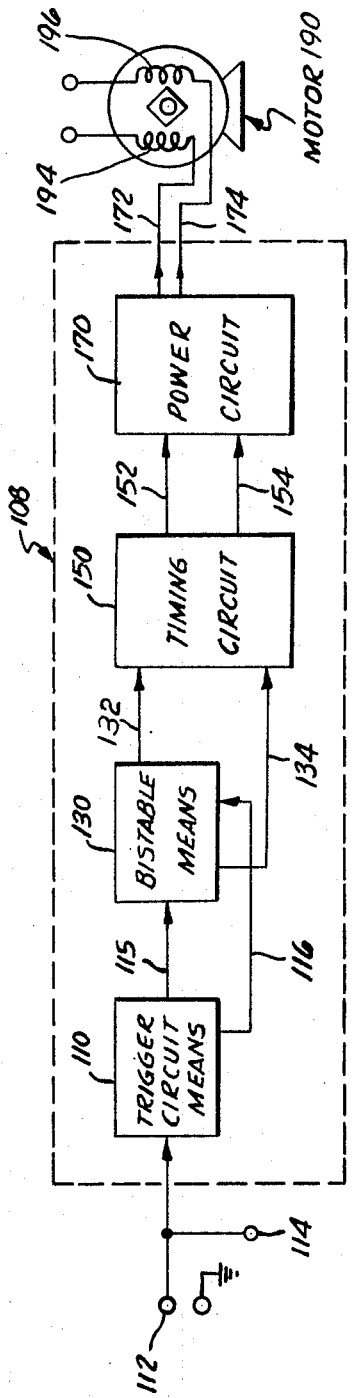
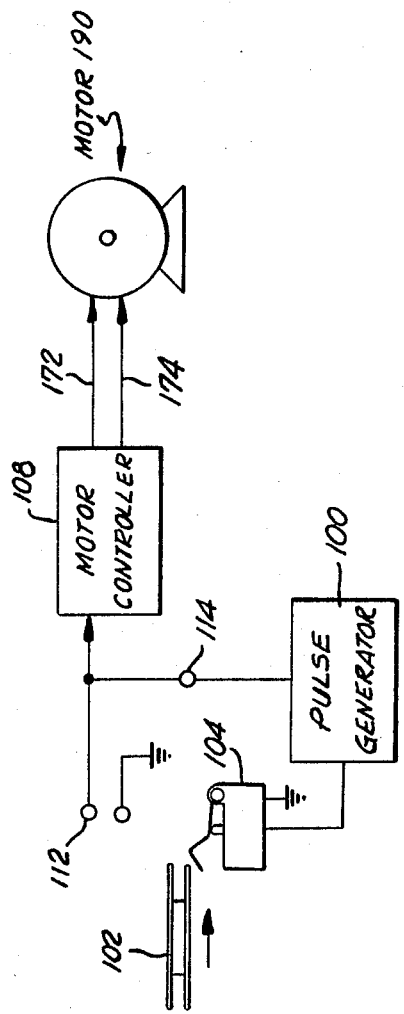

3,267,346
ALIGNING SYSTEM FOR STEP MOTOR
Max M. Liang, San Mateo, and Charles E. Mendenhall, Redwood City, Calif., assignors to Ampex Corporation, Redwood City, Calif., a corporation of California
Filed Jan. 2, 1964, Ser. No. 334,985
3 Claims. (Cl. 318—138)

This invention relates to a motor controller and more particularly to a motor controller that insures reliable operation of the motor.

In certain stepping motors such as the one described in U.S. Patent 2,834,896 one winding of the motor must be energized and then the other winding of the motor must be energized in order to successively step the motor. If the same winding is energized successively rather than alternately, the motor will not perform its stepping function. More specifically when the motor is used in a computer or a recorder system it is important that the first energization of the motor be transmitted to the proper winding, that is, the one aligned with the rotor to cause a stepping action.

It is the general object of this invention to provide a motor controller that will reliably energize the windings of the motor;

Another object of the invention is to provide a motor controller which will insure that the first input signal or move command to the motor controller will result in the motor being stepped;

Another object of the invention is to provide a motor controller that is well suited for applications such as data systems and incremental recorders.

These and other objects and advantages will be fully understood when the detailed written description is read in conjunction with the drawings wherein:

FIGURE 1 is a functional block diagram of the motor controller system; and

FIGURE 2 is a functional block diagram of the motor controller subassembly.

Referring to FIGURE 1 the motor controller system includes a sensing or actuating means 104 for triggering a pulse generator means 100 to generate a single pulse. The pulse generator means 100 in turn is connected to a motor controller means or subassembly 108. The motor controller subassembly 108 functions to alternately supply a constant amount of charge to the windings of the motor 190 via one of its output conductors 172 or 174.

The motor controller subassembly 108 is shown in greater detail in FIGURE 2. Typical circuits that may be employed in this subassembly are described in U.S. patent application 334,989 filed on January 2, 1964 and assigned to the assignee of this invention. It is within the scope of this invention to use other well known means to perform the functions demanded by the particular parts of the motor controller subassembly. The motor controller subassembly 108 includes a trigger circuit means 110 that has input terminals 112 and 114 connected to it. The terminals 112 and 114 receive move commands or input signals from an input source (not shown) and setting or alignment pulses from the pulse generator means 100. The trigger circuit means 110 is adapted to simultaneously generate a plurality of outputs and more particularly two outputs that are connected to a bi-stable means 130 by the conductors 115 and 116 when either an input signal or alignment pulse is received.

The bi-stable means 130 may be any of the well known electronic means that assumes one stable state or another and moves from the one stable state to the other stable state when an input signal is supplied to one of a plurality of its input terminals. More particularly, the bi-stable means 130 supplies an output to one of the conductors 132 or 134. If an output is supplied to the conductor 132 and an input trigger pulse is received, the output at the conductor 132 will be substantially turned off and an output will be supplied to the conductor 134. The conductors 132 and 134 of the bi-stable means 30 are connected to a timing circuit means 150.

When the timing circuit means 150 is energized by an output from the bi-stable means 130, it functions to enable the power circuit 170 to energize a motor 190. More particularly the timing circuit 130 turns on one of the outputs 172 or 174 of the power circuit 170 for a period of time that enables it to supply a substantially constant amount of energy to a motor winding 194 or 196. The timing circuit means 150 is connected to the power circuit or power output circuit 170 by two conductors 152 and 154. The exact period which the timing circuit means 150 enables the power output circuit 170 to energize the motor 190 is not usually constant. The period varies according to the level of the voltage supplied by an unregulated voltage which enregizes the motor controller so that a constant amount of charge is supplied to the oppositely wound motor windings 194 and 196.

Typically the motor 190 utilized is one such as is disclosed in U.S. Patent 2,834,896. In this type of motor it is necessary that the power output circuit 170 initially energize a particular one of the windings of the motor or the motor will not be operated. Under these circumstances a move signal supplied to the input terminal 112 will fail to operate the motor if the bi-stable means 30 is in a condition that the first input signal causes an output from the bi-stable means 30 which results in the power circuit 170 energizing the wrong winding. This results in a loss of synchronization and information.

To avoid this shortcoming, the pulse generator means 100, is connected to the input terminal 114 of the motor controller subassembly 108. The pulse generator means 100 generates a single pulse each time a medium carrier means, reel or cartridge 102 is inserted in a recorder, assuming that the controller is used in connection with the recorder. The triggering of the pulse generator means 100 is accomplished by the carrier means 102 which operates a sensing or actuating means, such as switch 104 when inserted in the recorder. The pulse generator means 100 may take the form of a monostable multivibrator with only one of its outputs being utilized or the switching action of the switch 104 may be such that an electrical pulse generator is formed. It is well within the scope of the invention to form other pulse generators compatible with the invention. If the motor controller is used in a different environment, the pulse generator 100 may be operated manually or by other actuating means.

In operation the insertion of the reel 102 operates the switch 104 causing an alignment pulse to be supplied to the input terminal 114 by the pulse generator 100. The pulse supplied to the terminal 114 will cause a trigger pulse to be generated by the trigger circuit means 110 which switches the bi-stable means 130 from one stable state to another stable state. Assuming the bi-stable means 130 to originally have an output at the conductor 132, the trigger pulse will cause an output to result at the conductor 134. This output at the conductor 134 energizes the timing circuit output 154 to enable the power circuit output 174 for a period of time. The enabling of the power circuit output 174 results in the energization of the winding 196. If the winding 196 is the winding that must be energized to cause movement of the motor, the motor will be incremented or stepped. If the energized winding 196 was not properly aligned with the rotor of the motor to cause stepping, the triggering pulse to the bi-stable means 130 will place it in condition that the first input command to the terminal 112 will cause the bi-stable means 130 to move to a stable state that results in a stepping or incrementing of the motor 190. In either event the motor controller will be in condition to perform a stepping function when the input signals are received. It can be seen that the motor controller shown in FIGURE 1 avoids the loss of information and insures synchronization. It is also well suited for use in data systems and incremental recorders where synchronization and reliability are of extreme importance.

While the above detailed description has shown, described and pointed out the fundamental novel features of the invention as applied to a preferred embodiment, it will be understood that various omissions and substitutions and changes in the form and details of the device and method illustrated may be made by those skilled in the art, without departing from the spirit of the invention. It is the intention, therefore, to be limited only as indicated by the scope of the following claims.

What is claimed is:

1. An alignment system for a step motor which has a plurality of windings, an output shaft, and a rotor operatively coupled to said output shaft, wherein a given one of said windings must be energized to step the rotor, the combination comprising:
    a motor controller for energizing said windings;
    said motor controller having an input terminal for receiving input signals and having a plurality of outputs each of which is connected to one of said windings, said motor controller alternating between stable states to generate an output at one of said outputs at a time; and
    means coupled to said motor controller to establish the selected stable state therein for generating a single aligning output at the output and respective winding when energized will move said output shaft prior to application of the input signals, whereby the first subsequent input signal to said controller input terminals will result in movement of said output shaft.

2. The combination comprising:
    a stepping motor having a plurality of windings, an output shaft and a rotor operatively coupled to said output shaft;
    said rotor and said windings constructed so that it is necessary to energize a given one of said windings to cause said rotor to move;
    a motor controller connected to said windings for energizing said windings;
    said motor controller energizing one of said windings and then another of said windings;
    said motor controller having an input terminal for receiving input signals; and
    a pulse generator means for supplying an aligning pulse to said input terminal of said motor controller prior to said motor controller receiving input signals, whereby said first input signal will result in an incrementing of said output shaft.

3. In a recorder system, the combination comprising:
    a stepping motor having a plurality of windings, an output shaft and a rotor operatively coupled to said output shaft;
    said rotor and said windings constructed so that it is necessary to energize a given one of said windings to cause said rotor to move;
    a motor controller connected to said windings for energizing said windings;
    said motor controller energizing one of said windings and then another of said windings;
    said motor controller having an input terminal for receiving input signals;
    a pulse generator means for supplying an aligning pulse to said input terminal of said motor controller prior to said motor controller receiving input signals;
    a switch means coupled to said pulse generator means for energizing said pulse generator to generate the aligning pulse; and
    a recording mechanism means for operating said switch when positioned in said recorder, whereby said positioning of said recording mechanism means results in the pulse generator supplying a pulse to the motor controller so that the first of the input signals results in an incrementing of the motor.

References Cited by the Examiner
UNITED STATES PATENTS

| | | | |
|---|---|---|---|
| 3,027,112 | 3/1962 | Flan | 242—55.19 |
| 3,126,162 | 3/1964 | MacKenzie | 242—55.19 |
| 3,165,684 | 1/1965 | Ensink et al. | 310—49 X |

ORIS L. RADER, *Primary Examiner.*

S. GORDON, G. SIMMONS, *Assistant Examiners.*